(No Model.)
G. W. JORDAN.
PLANER CHUCK.
No. 545,895. Patented Sept. 10, 1895.
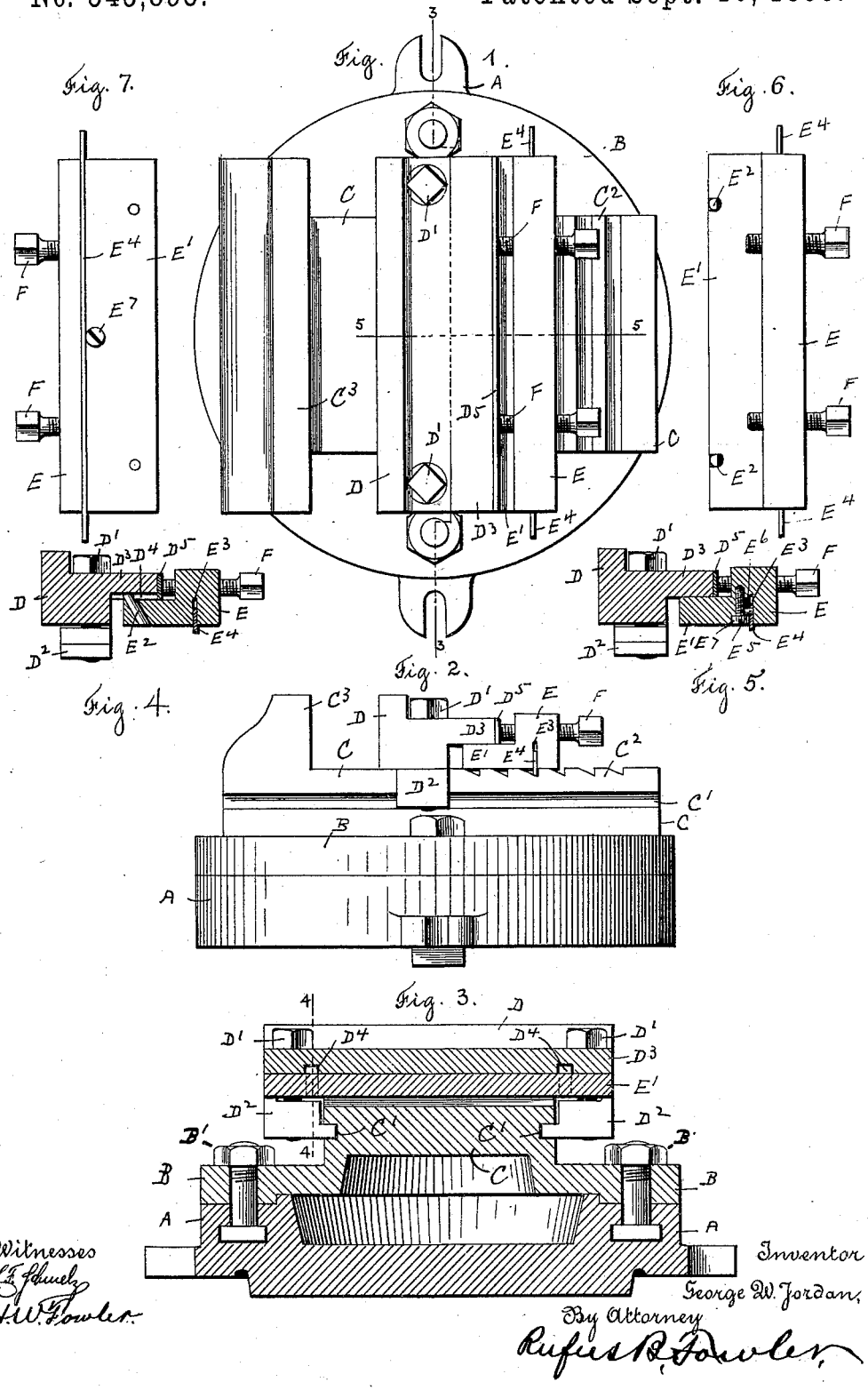

UNITED STATES PATENT OFFICE.

GEORGE W. JORDAN, OF WORCESTER, MASSACHUSETTS.

PLANER-CHUCK.

SPECIFICATION forming part of Letters Patent No. 545,895, dated September 10, 1895.

Application filed January 28, 1893. Serial No. 460,143. (No model.)

*To all whom it may concern:*

Be it known that I, GEORGE W. JORDAN, a citizen of the United States, residing at Worcester, in the county of Worcester and State of Massachusetts, have invented a new and useful Improvement in Planer-Chucks, of which the following is a specification, reference being had to the accompanying drawings, forming a part of the same, and in which—

Figure 1 represents a top view of a planer-chuck embodying my invention. Fig. 2 is a side view of the same. Fig. 3 is a sectional view of the movable jaw and holding-block on line 3 3, Fig. 1. Fig. 4 is a sectional view of the movable jaw and holding-block on line 4 4, Fig. 3. Fig. 5 is a sectional view on line 5 5, Fig. 1. Fig. 6 is a top and detached view of the holding-block, and Fig. 7 is a view of the under side of the holding-block.

Similar letters refer to similar parts in the different figures.

My invention relates to certain improvements in the construction of planer-chucks, as hereinafter described, and set forth in the accompanying claims.

Referring to the accompanying drawings, A denotes the base of the chuck, adapted to be attached to the table of a planer and having mounted thereon a plate B, capable of being turned or partially rotated upon the base for the purpose of allowing the position of the jaws to be varied and attached to the base by bolts B' B' in the usual manner. Supported by and preferably integral with the plate B is a bar C, provided with grooves C' C' on its opposite sides, serving as ways for the gibs $D^2$, which are attached by bolts D' to the movable jaw D. The upper surface of the bar C is provided with transverse ratchet-teeth $C^2$, also with a fixed jaw $C^3$. The movable jaw D slides upon the upper surface of the bar C and is provided with an overhanging lip $D^3$, having upon its under side the shallow grooves $D^4$ $D^4$, with their outer ends closed by a steel plate $D^5$, which is attached to the edge of the lip $D^3$. Immediately behind the movable jaw D is a holding-block E, capable of sliding upon the upper surface of the bar C and provided with a lip E', extending beneath the lip $D^3$ of the movable jaw, and having pins $E^2$, held in the lip E', with their projecting ends entering the grooves $D^4$ $D^4$, so that when the holding-block E is moved along, withdrawing the lip E' from beneath the lip $D^3$ of the movable jaw, the projecting ends of the pins $E^2$ will strike against the lower edge of the plate $D^5$, attached to the edge of the lip $D^3$, causing the movable jaw D to be drawn along by the movement of the holding-block. The projecting ends of the pins $E^2$ enter slots $D^2$ instead of holes in the lip $D^3$ in order to allow a limited movement of the lip $D^3$ over the lip E'. A slot $E^3$ is cut in the under side of the holding-block E to receive the steel blade $E^4$, adapted to fall by its own weight and engage the teeth $C^2$ and prevent the holding-block E from being moved away from the fixed jaw $C^3$. The teeth $C^2$, however, offer no resistance to the movement of the holding-block toward the fixed jaw, as the inclined sides of the teeth serve as cam-surfaces to raise the steel blade $E^3$ and allow it to pass over the ends of the teeth; but when the holding-block is moved away from the fixed jaw the steel blade $E^4$ is caught by the vertical sides of the teeth. A pin $E^5$ projects from the side of the steel blade $E^4$ and enters a chamber $E^6$ at the side of the slot $E^3$, thereby holding the blade $E^4$ from longitudinal movement. A small screw $E^7$ is inserted in the under side of the holding-block and closes the end of the chamber $E^6$ in order to prevent the steel blade $E^4$ from falling out when the holding-block E is removed from the chuck. Screws F F are held in the holding-block E with their ends bearing against the steel plate $D^5$ on the edge of the lip $D^3$, by which the movable jaw is forced against the work placed between the jaws. The movable jaw D can be clamped upon the bar C by means of the gibs $D^2$ and bolts D'. The space between the gibs $D^2$ is slightly greater than the width of the bar C in order to allow the movable jaw D to be placed at an angle with the fixed jaw $C^3$.

The arrangement of the base A, adjustable plate B, bar C, with its fixed jaw and movable jaw D, and holding-plate E is substantially like the similar parts of planer-chucks heretofore made, and their construction and use will be readily understood. It has, however, been customary to attach the movable jaw to the bar C by means of a clamping-bolt entering a groove in the upper surface of the bar, which is liable to become filled with dirt and planer-chips.

In my improved chuck I dispense with the longitudinal grooves in the face of the bar C and employ instead the side grooves C', with the gibs $D^2$ and tightening-bolts D'. I also connect the holding-block and movable jaw by means of the pins $E^2$, engaging the lower edge of the plate $D^5$, thereby causing the movable jaw to be drawn back by the movement of the holding-block, but allowing the holding-block to be readily detached from the movable jaw when it is drawn off the end of the bar C. I also provide means by which the locking-plate $E^4$ is held from longitudinal movement and is retained within the slot $E^3$ when the holding-block is detached from the chuck.

In some forms of planer-chucks the rotating plate is dispensed with and the bar C is formed integrally with the face of the chuck.

What I claim as my invention, and desire to secure by Letters Patent, is—

1. In a planer chuck, the combination with a movable jaw D having a lip $D^3$ provided with grooves $D^4$ on its under side, a plate $D^5$ attached to the edge of said lip and closing the ends of said grooves, a holding block E provided with a lip E' extending beneath said lip $D^3$ and pins $E^2$ held in said lip E' and having their ends projecting into said grooves $D^4$, substantially as described.

2. In a planer chuck, the combination with the bar C, provided with teeth $C^2$ and a movable jaw D, adapted to slide along said bar, of a holding block E provided with slots $E^3$ and $E^6$, locking blade $E^4$ held in the slot $E^3$, pin $E^5$ projecting from said locking blade and entering the slot $E^6$ and a retaining screw $E^7$, substantially as described.

Dated this 19th day of January, 1893.

GEORGE W. JORDAN.

Witnesses:
RUFUS B. FOWLER,
H. M. FOWLER.